(No Model.) 7 Sheets—Sheet 1.

C. H. EMERY.
PROCESS OF AND MACHINE FOR SOLDERING CANS.

No. 473,216. Patented Apr. 19, 1892.

(No Model.)

C. H. EMERY.
PROCESS OF AND MACHINE FOR SOLDERING CANS.

No. 473,216.

Patented Apr. 19, 1892.

(No Model.)

C. H. EMERY.
PROCESS OF AND MACHINE FOR SOLDERING CANS.

No. 473,216. Patented Apr. 19, 1892.

(No Model.)  7 Sheets—Sheet 4.

C. H. EMERY.
PROCESS OF AND MACHINE FOR SOLDERING CANS.

No. 473,216. Patented Apr. 19, 1892.

(No Model.) 7 Sheets—Sheet 5.

C. H. EMERY.
PROCESS OF AND MACHINE FOR SOLDERING CANS.

No. 473,216. Patented Apr. 19, 1892.

Witnesses
Inventor
Charles H. Emery (No Model.)  
7 Sheets—Sheet 7.

C. H. EMERY.
PROCESS OF AND MACHINE FOR SOLDERING CANS.

No. 473,216. Patented Apr. 19, 1892.

Witnesses,  
W. Rossiter  
Nellie McKibben

Inventor  
Charles H. Emery,  
By Bond & Adams  
Attys.

United States Patent Office.

CHARLES H. EMERY, OF CHICAGO, ILLINOIS, ASSIGNOR TO HIMSELF AND CHARLES P. LIBBY, OF SAME PLACE.

PROCESS OF AND MACHINE FOR SOLDERING CANS.

SPECIFICATION forming part of Letters Patent No. 473,216, dated April 19, 1892.

Application filed August 20, 1891. Serial No. 403,241. (No model.)

*To all whom it may concern:*

Be it known that I, CHARLES H. EMERY, a citizen of the United States, residing at Chicago, in the county of Cook and State of Illinois, have invented a certain new and Improved Process of and Machine for Soldering Cans, of which the following is a specification, reference being had to the accompanying drawings, in which—

Figures 1$^a$, 1$^b$, and 1$^c$ show a side elevation of the machine, Figs. 1$^a$ and 1$^c$ being views of the ends of the machine, and Fig. 1$^b$ being the intermediate section. I have shown a side elevation of the machine in three sections, as above described, for the reason that the length of the machine is such that it could not all be shown clearly in a single continuous view. Fig. 12$^a$ is a detail view of a portion of the wiper mechanism.

My invention relates to machines for soldering the seams of cans, and more particularly to machines which are designed to solder the ends upon cans after the parts have been fitted together, and is especially adapted to be used in soldering cubical cans.

One of the objects of my invention is to provide a new and improved process of soldering cans which may be easily practiced and by which cans may be quickly and effectually soldered and with the least possible amount of solder.

Another object is to provide an improved machine for putting my process into operation.

I accomplish these objects as hereinafter specified and as illustrated in the drawings.

That which I regard as new will be pointed out in the claims.

In soldering a cubical can by the use of my improved process the seams of one end of the can are soldered consecutively, one edge of the can being first dipped into a solder bath and the next consecutive edge being soldered by the surplus solder which is taken up by the edge of the can which passes through the solder bath. The third edge of the can is then passed through another solder bath, and the fourth edge is soldered in a manner substantially similar to that in which the second edge was soldered.

In preparing cans to be soldered by my improved machine the ends are first fitted upon the bodies of the cans and the usual acid is applied to the seams before the cans are introduced into the machine. After the cans have been placed in the machine they are carried along upon a heated plate, the lower end of the can resting upon the surface of the plate, so that such end will become heated to a high temperature as it moves along the machine. At a suitable point in the machine is located a solder tank or pot, which is so arranged that one edge of the can will be dipped into the solder as it is moved along, and will thereby be soldered. It will also take up a small amount of surplus solder both on the inside and outside. After the can passes through the first solder-pot it is returned to a vertical position and moved down an incline upon the heating-plate, and the surplus solder taken up by the can during its passage through the first solder-pot will thereby be directed to the lower front edge of the can and will run along such edge both on the inside and outside of the can, thereby soldering it. As the amount of solder taken up by the can in its passage through the first solder-pot will not be more than enough to solder the next successive edge of the can after passing down the incline above referred to, the heating-plate is inclined in such a direction that the edge of the can opposite to that which passes through the first solder-pot will be tilted downward and will pass through a second solder-pot, which is suitably arranged at this point. The third edge of the can will thereby be soldered, and a small amount of surplus solder will also be taken up on the inside and outside of the can. The can is then returned to a vertical position and carried up a second incline upon the heating-plate, and, as before, the surplus solder will be directed to the rear lower edge of the can and will run along said edge and will solder it as the can moves up the incline. In order to form a perfect union between the solder on the first and last soldered edges of the can, the heating-plate is slightly inclined laterally after it passes up from the second solder-pot in such manner that the solder as it flows along the rear lower edge of the can will be given a slight forward impulse, sufficient to cause it to flow far enough to extend to the edge first soldered. The soldered edges of the can are then wiped by suitable wipers to remove any surplus solder, and the end of the can is then cooled by a cold-air blast, which is arranged to play upon it. The can is then reversed by a suitably-arranged device, and the opposite end is then passed along the heated surface and is soldered in a manner similar to that in which the first end was soldered.

In soldering cans by my improved process I prefer to immerse one edge in the solder, then tilt the can, as above described, to solder the adjacent edge, then immerse the next edge in the solder, and again tilt the can to solder the fourth edge; but I do not wish to limit myself to immersing opposite edges, as it is evident that the can might be soldered by immersing one edge, then tilting the can to solder an adjacent edge, then immersing an edge adjacent to that first soldered, and then tilting the can to solder the remaining unsoldered edge of the can.

My improved machine, as will be hereinafter described, is designed to solder cans after the manner first suggested, as that is the way in which I prefer to do it.

I will now describe more specifically the construction and operation of my improved machine.

In the drawings, 15 indicates the frame of the machine, which consists of metallic frames 16, supported by standards 14, which are secured to the frames and extend downward to the floor. The frames 16 are adapted to support the various parts of the machine.

Figure 1:
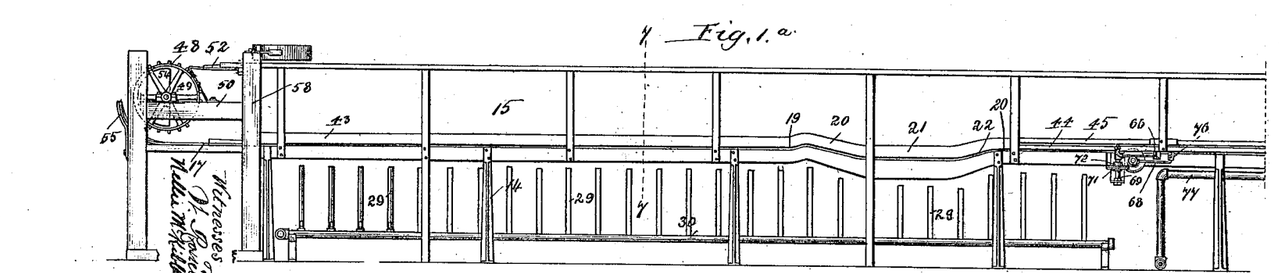
Figure 6:
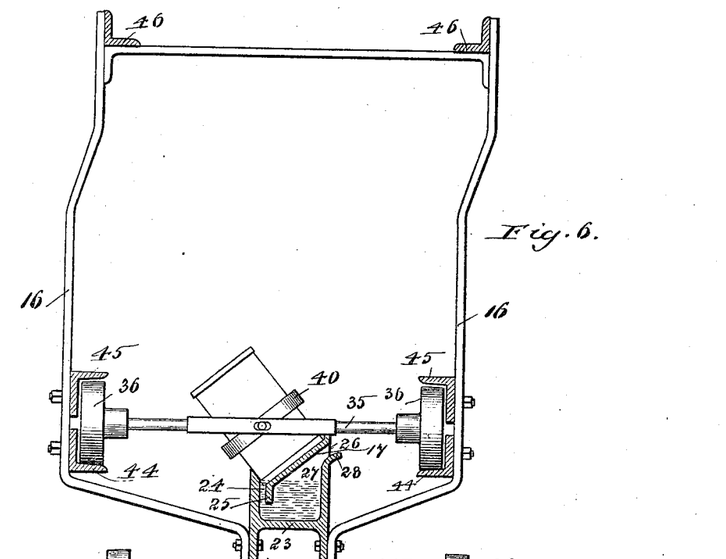
Fig. 6 is an enlarged vertical cross-section on line 6 6 of Fig. 2 looking in the direction in which the can is moving.
Figure 7:
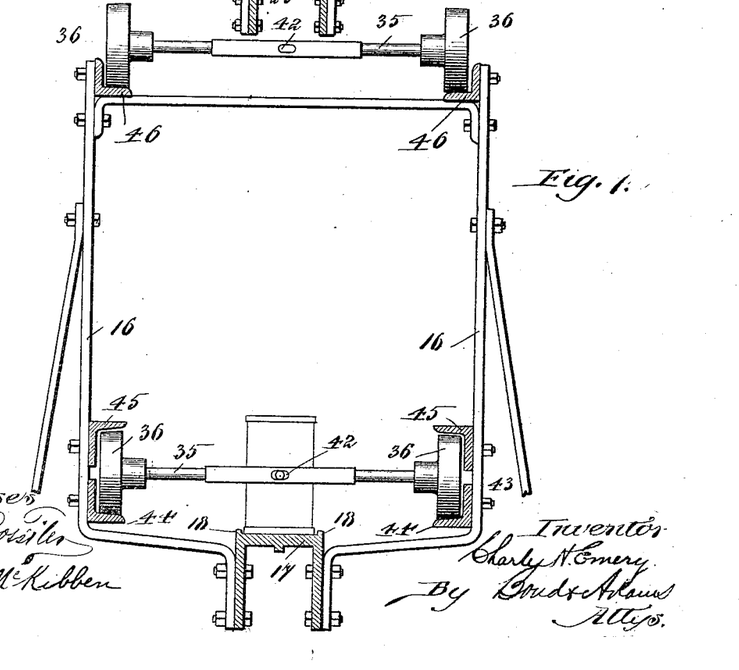
Fig. 7 is a similar view on line 7 7 of Fig. 1$^a$, a can being shown on the heating-plate.

17 indicates a plate, which extends the length of the machine and is centrally secured to the lower part of the frames 16, as best shown in Fig. 7. The plate 17 consists of a metallic plate of suitable width to support a can and is provided with lateral flanges 18, which are adapted to guide the can and prevent it from slipping off the plate. The plate 17 is horizontal near the end of the machine at which the cans are fed into it. It thence extends horizontally along the machine for a suitable distance, and is then laterally inclined at about the point indicated by 19 in Fig. 1ª, so that as the can moves upon it it will be tilted to one side, either to the right or to the left, as may be desired. The plate is thus inclined for a short distance, and is then forwardly and downwardly inclined, as shown at 20 in Fig. 1ª, the edges of the plate then being in a horizontal plane, so that the right and left hand sides of the can will be perpendicular. The plate 17 is thus forwardly and downwardly inclined for a short distance, and then extends again in a horizontal direction, but is again laterally inclined at the point indicated by 21 in Fig. 1ª, this time in a direction opposite to that in which it was first laterally inclined. I prefer to incline the plate 17 first so that the can will be tilted to the right and afterward the forwardly and downwardly inclined portion to incline it so that the can will be tilted to the left. The position of the plate when laterally inclined in one direction is best shown in Fig. 6. After its second lateral inclination, at 21, the edges of the plate again lie in the same plane and the plate is upwardly and forwardly inclined, as best shown at 22 in Fig. 1ª. At the top of the incline shown at 22 the plate is again inclined slightly in a direction similar to that in which it was first inclined and thence extends horizontally, as at first.

23 indicates solder-pots, one of which is supported in the frame 16 at a point under each lateral inclination of the plate 17, as indicated at 19 and 21 in Fig. 1ª. The solder-pots 23 are open at the top, as best shown in Fig. 6, and the plate 17, where it passes over them, is so arranged as to extend downward into the upper part of the solder-pot, leaving a narrow passage 24 at one side of the pot, through which solder may pass up onto the upper side of the lower edge of the plate 17. The edge of the plate which extends down into the solder-pot is provided with a downwardly-extending lip 25, which extends into the solder, so as to separate the solder which flows to the upper edge of the plate 17 from the surface of the solder in the remaining portion of the solder-pot. By this construction the oxidized solder upon the surface of the molten solder in the solder-pot cannot flow to the upper edge of the plate 17 and thereby interfere with the process of soldering. As the solder in the channel 24 is being constantly used, it will not oxidize to any great extent. The upper portion of the plate 17 over the solder-pot is secured to the solder-pot and supported by a plate 26, which is connected to the plate and to the solder-pot, as best shown in Fig. 6, an opening 27 being left for the admission of a supply of solder into the pot.

28 indicates an outwardly-projecting lip upon the edge of the solder-pot under the opening 27, which is adapted to direct the solder into the solder-pot.

Figures 2, 13:
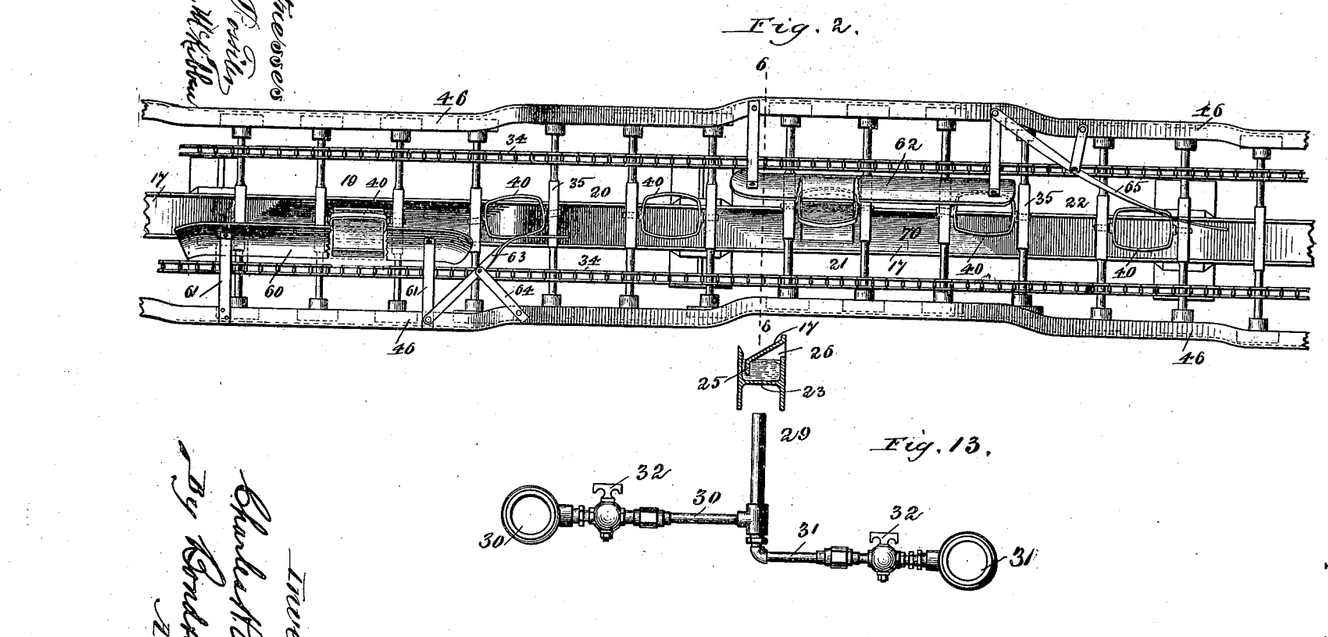
Fig. 2 is a top or plan view of a portion of the machine.
Fig. 13 is an enlarged detail, being a partial cross-section showing a sectional view of one of the solder-pots and the heating apparatus in elevation.

29 indicates gas-burners, which are located at short intervals under the plate 17 and solder-pots 23, and are adapted to keep the plate 17 at a high temperature and to keep the solder in the solder-pots in a molten condition. The burners are placed under the plate 17 at all points except that immediately following the upwardly inclined portion 22, as it is very necessary that during the entire process of soldering one end of the can the plate should be kept heated. The burner 29 is adapted to burn a mixture of gas and air, the gas being introduced through a pipe 30 and the air being supplied through a pipe 31, which is connected to the pipe 29 below the point at which the gas-pipe is connected to said pipe 29, as best shown in Fig. 13. Suitable stop-cocks 32 are provided in each of the pipes 30 and 31, whereby the supply of gas or air may be cut off. The gas is supplied from any suitable source of supply, and the air-current is generated by means of any suitable blowing apparatus.

Figure 5:
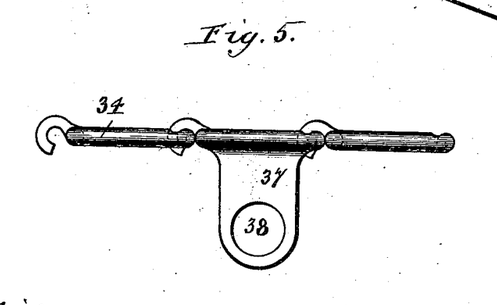
Fig. 5 is a detail, being a side elevation of a portion of the carrying-chain.
Figures 8, 9:
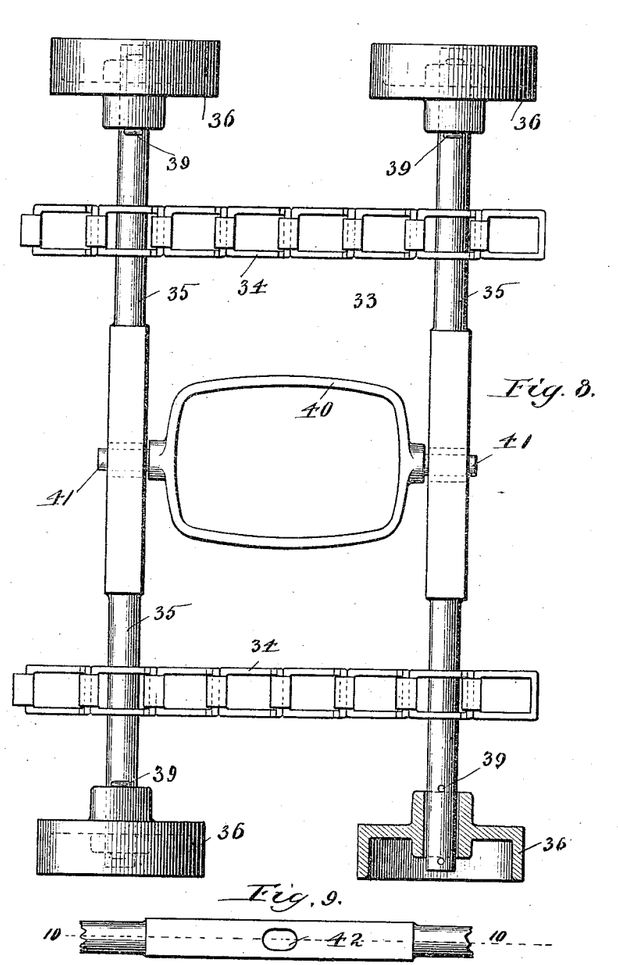
Fig. 8 is an enlarged top or plan view of the carrying-chain.
Fig. 9 is an enlarged detail, being a side elevation of a portion of one of the cross-bars.
Figure 10:
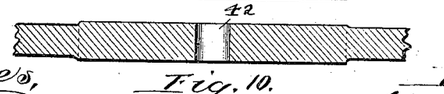
Fig. 10 is a horizontal section on line 10 10 of Fig. 9.

33 indicates the apparatus for carrying the cans along the machine, and it consists of endless chains 34, carried by cross-bars 35, mounted upon rollers 36, as best shown in Fig. 8. The chains 34 are composed of links adapted to be engaged by suitable sprocket-wheels, and the chains are mounted upon the cross-bars 35 by means of links 37, (see Fig. 5,) which links are formed with a downwardly-extending ear having an eye 38, adapted to receive the outer portion of one of the cross-bars 35. The cross-bars are rounded at their outer ends, so that they will fit into the eyes 38. The rollers 36 are journaled upon the ends of the cross-bars 35 and are secured in place, preferably, by means of pins 39, as best shown in Fig. 8.

40 indicates a frame, which is of such shape that it will be adapted to receive a can and is provided with trunnions 41. A frame 40 is trunnioned between each alternate pair of cross-bars 35, the trunnions 41 resting in sockets 42. The sockets 42 are so placed that the axis of the frame 40 will lie at right angles to the cross-bars 35. By this construction the frame 40 will be adapted to tilt in a direction at right angles to the line of motion of the carrying-chain. If desired, a frame 40 may be placed between each pair of cross-bars 35, so that a large number of cans may be passed through the machine at once. The shape of the frame 40 may be altered to correspond with the shape of the cans it is desired to solder. The frames 40 may be pivoted instead of trunnioned, if desired.

The rollers 36 upon the ends of the cross-bars 35 are adapted to move in tracks 43, formed by angle-irons 44 and 45, the irons being so placed as to project under and over the rollers, so as to prevent them from jumping the track. The tracks 43 are supported by the frame 16 at such a height that when the can is placed in the frame 40 it will rest upon the plate 17, as best shown in Fig. 7, and the tracks are inclined to correspond with the inclined portions 20 and 22 of said plate. At the point 19, where the first lateral inclination of the plate 17 occurs, which, as has been hereinbefore described, is preferably to the right, the angle-irons which compose the track 43 are deflected slightly to the right, so as to carry the frames 40 a short distance to the right, and thereby allow the edge of the cans to be immersed more completely in the solder-pots. At the point 20, where the first downward incline occurs, the track extends in its former line, and at the point 21, where the plate 17 is laterally inclined to the left, the track is deflected to the left for reasons similar to those for which it was first deflected to the right. The general outline of the track at the points where the inclines occur is best shown in Fig. 2.

46 indicates angle-irons, which are secured at the upper portion of the frame 16 and form tracks for the return of the endless chain to the forward end of the machine. After carrying the cans along the plate 17 the carrying-chain passes upward around suitable sprocket-wheels 47 and the rollers 36 are delivered upon the angle-irons 46, upon which they move, as above described, to the forward portion of the machine. The sprocket-wheels 47 are mounted upon bearings, which are adjustably mounted in the end of the frame of the machine, as best shown in Fig. 1ᶜ. They are adjusted by means of screws 13, which pass through brackets 12, which are secured upon the ends of the frame of the machine, the ends of the screws being connected to the ends of the sprocket-wheel bearings. By adjusting the sprocket-wheels 47 the tension of the carrying-chain may be adjusted.

The carrying-chain is operated by means of sprocket-wheels 48, which are located at the forward end of the machine, which sprocket-wheels are mounted upon and keyed to an axle 49, which is journaled in the end of the frame upon cross-bars 50 and a supporting-bar 56 and is operated by any suitable driving mechanism. A sprocket-wheel 48 is located at each side of the machine in such position that it will be adapted to engage the links of the chains 34, and its sprockets 51 are of such size that they will be adapted to enter said links. The power may be applied to the wheels 47 instead of to the wheels 48, if desired.

52 indicates a plate, which is centrally placed at the upper part of the forward end of the machine. Upon the plate 52 is mounted a wedge-shaped guide-plate 53, which extends upward in such position that it will be adapted to engage the frames 40 upon the carrying-chain if they should happen to lie out of a horizontal position   It is upwardly inclined at 53', so that if it should happen that the frames 40 are not in a horizontal position they will strike the inclined portion 53' of the plate 52 and will be turned into a horizontal position, so that a can may be placed in them.

Figure 3:
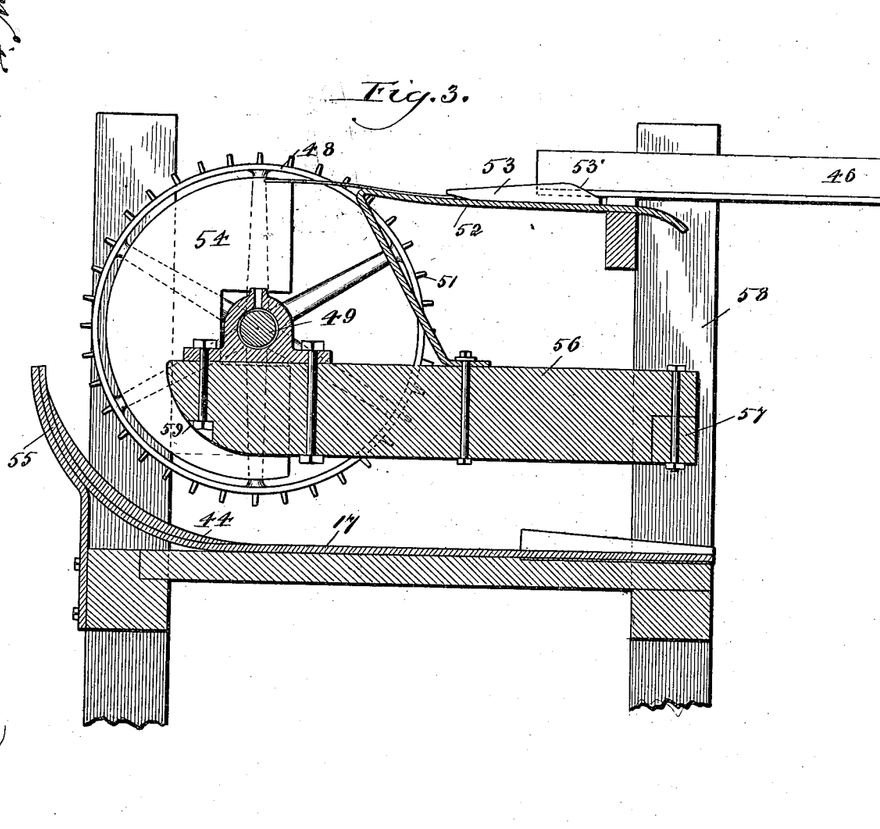
Fig. 3 is a central longitudinal vertical section of the left-hand end of Fig. 1$^a$.
Figure 4:
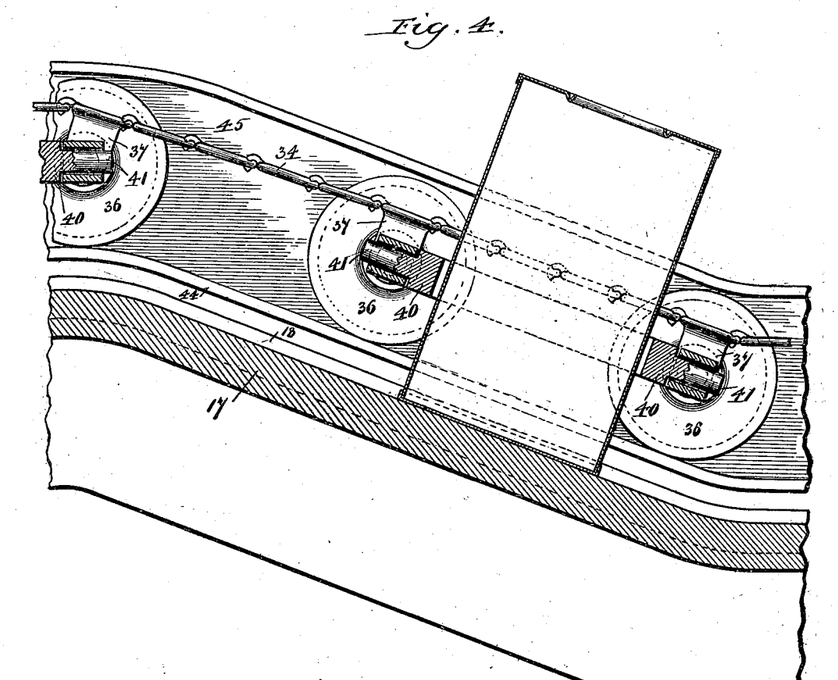
Fig. 4 is a similar view of one of the forwardly-inclined portions of the heating-plate, showing the carrying-chain and the position of a can as it appears when moving down said incline.

The cans are placed in the frames 40 at the upper part of the machine at a point between the upper portions of the sprocket-wheels 48, and are then carried around by the motion of the carrying-chain to the under side of the wheels 48, when the rollers 36 will rest upon the tracks 43, which are curved upward, as best shown in Fig. 3, and will then be moved along through the machine.

In order to prevent the cans from tipping laterally as they are moved around from the upper to the lower portion of the machine, plates 54 are provided, one of which is secured at each side of the supporting-bar 56 in such position that the cans will have to pass between them as they move around the wheel, and the plates 54 are placed so close together that they will prevent the can from tipping laterally.

The plate 17 at the forward end of the machine is curved upward, as shown at 55 in Fig. 3, so that it will be adapted to receive the cans as they are carried from the upper to the lower portion of the machine if they should happen to fall partially out of the frame 40 in which they are carried.

The supporting-bar 56 is supported at one end upon a cross-bar 57, which is secured in standards 58, as best shown in Fig. 3, and the supporting-bar extends horizontally to the adjacent end of the machine and is curved, as shown at 59 in Fig. 3, the curved portion being so placed that as the carrying-chain moves around the sprocket-wheels the cans carried by the frames 40 will come in contact with such curved portion and will be forced partially out of the frames 40, so that they will rest upon the plate 17. As the cans commonly used in packing meats and other articles are usually larger at one end than at the other, when the smaller ends of such cans are inserted in the frames 40 the cans are likely to become wedged into such frame, and when the carrying-chains pass around the sprocket-wheels to the lower track the cans might stick in the frames 40, and thereby be held at a short distance above the plate 17, and therefore would not be soldered. By forcing the cans downward upon the plate 17, as above described, the soldering of each can is insured.

60 indicates a plate, which is secured to one of the angle-bars 45 by means of straps 61 at such a point that it will extend over one of the laterally-inclined portions of the plate 17. The plate 60 is of such shape and is so placed that when the cans are moved along in the carrying-chain when they arrive at the laterally-inclined portion of the plate 17 under the plate 60 their upper ends will come in contact with such plate and will be pressed downward upon the plate 17, and thereby their lowermost edges will be more completely immersed in the solder bath. A plate 62, similar to the plate 60, is similarly secured over the second lateral inclination of the plate 17, as best shown in Fig. 2. The plate 62, however, is placed on the opposite side of the machine to that upon which the plate 60 is placed, since the solder-pot at that point is upon the opposite side and the inclination of the plate 17 is in an opposite direction.

63 indicates a spring-bar, which is secured to one of the angle-bars 45 and projects forward and over the plate 17 in such position that it will be adapted to engage the cans as they move along the plate at the point where the inclined portion 20 begins and will operate to turn them into a vertical position after they pass from the laterally-inclined portion 19 of the plate 17.

64 indicates a rod or bar, which is connected to the bar 63 and angle-iron 45 and serves as a brace for the bar 63.

65 indicates another spring-bar, which is secured to one of the angle-bars 45 at the side of the machine opposite to that at which the bar 63 is secured and operates in a similar manner to straighten the cans after they have passed out of the laterally-inclined portion 21 of the plate 17.

66 indicates a wiper, which is composed of some suitable soft material adapted to remove the surplus solder from the soldered edges of the can. The wiper 66 is adapted to bear against the side of the soldered edge of the can to remove any surplus solder and is supported in a clamp 67, which is carried upon the end of a rod 68, pivoted upon a vertical rod 69. The rod 69 is supported in a vertical position by means of a bracket 73, which is secured to one side of the plate 17 at a point near the termination of the upward incline 22. The plate 17 is narrowed to a rail, as at 17ª, at this point to permit the wipers to engage the can.

Figure 12:
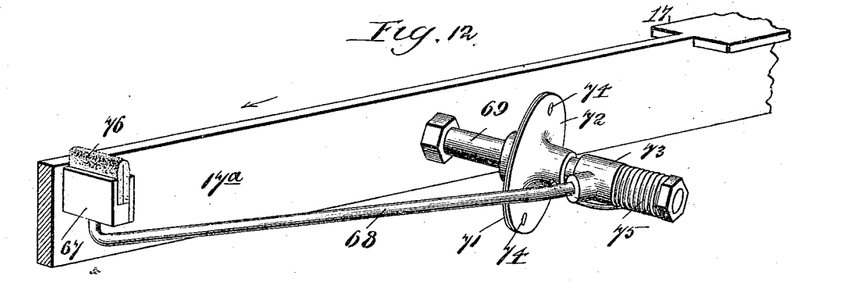
Fig. 12 is a similar view of one of the wipers for the lower edge of the can.
Figure 12A:
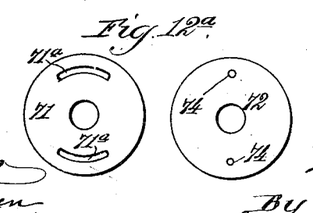
Figure 14:
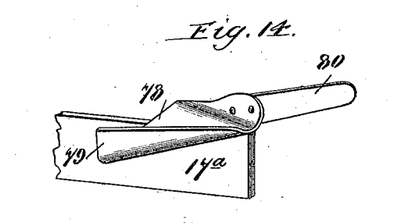
Fig. 14 is an enlarged detail, being a perspective view of the device for reversing the cans.

71 indicates a disk, which is horizontally secured upon the rod 69 and is provided with a flat upper surface, in which are segmental slots 17ª, Fig. 12ª. The disk 71 is keyed to the rod 69. 72 indicates a similar disk, which is secured to the bearing 73, which forms the inner end of the rod 68, and is so placed that its flat surface will rest upon the flat surface of the disk 71. Pins 74 are provided in the disk 72, which project slightly over the flat surface of said disk and are adapted to fit into slots in the disk 71. The slots in the disk 71 are of such length that they will permit only a slight rotation of the disk 72 upon the rod 69. This construction prevents the wiper 66 from being moved more than a certain distance from the edge of the plate 17. If desired, the pins may be placed in the disk 71 and the slots in the plate 72.

75 indicates a spring, which is coiled around the upper end of the rod 69 and is adapted to bear against the rod 68 in such manner as to hold it in contact with the cans as they move along the plate 17.

Figure 11:
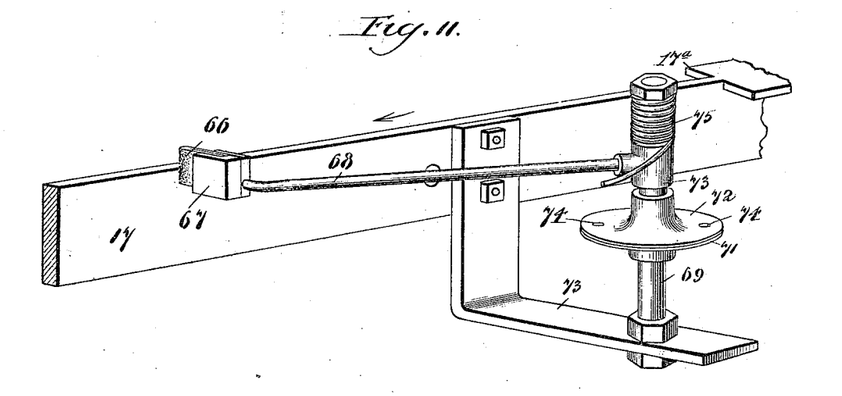
Fig. 11 is an enlarged detail, being a perspective view of one of the side wipers.

76 indicates a wiper similar to the wiper 66. The wiper 76 is mounted in a manner similar to that in which the wiper 66 is mounted, except that it is adapted to bear against one of the under edges of the cans, and instead of securing the rod 69 in a vertical position upon a bracket 70 it is secured directly to one side of the plate 17 and extends horizontally from said plate. One of each of the wipers 66 and 76 is placed at each side of the plate 17. The arrows in Figs. 11 and 12 indicate the direction in which the cans move when they are acted upon by the wipers.

77 indicates a pipe, which extends longitudinally under the frame of the machine at a point beyond the wipers. The pipe 77 is perforated along its upper edge and is connected with some suitable blowing mechanism, so that it will be adapted to conduct a current of cold air and direct it against the cans, after they pass the wipers, to cool the cans.

I will now describe the operation of soldering the seams of one end of a can, referring to the drawings, so that the operation may be easily understood.

The cans are placed in the frames 40 at the top of the machine at a point over the plate 52. (Best shown in Fig. 3.) The cans are then carried around the end of the machine by the operation of the carrying-chains and are forced downward to rest upon the plate 17 by the action of the curved end 59 of the bar 56. They are then moved along upon the plate and are subjected to a high degree of heat until they reach the laterally-inclined portion of the plate located at 19 in Fig. 1ª or in Fig. 2. At this point, as above described, the plate is laterally inclined so as to tip the can, preferably to the right. The lower edge of the plate 17 is immersed in molten solder in the solder-pot 23, as shown in Fig. 6, and the lower edge of the can is therefore immersed in the solder as it passes along upon the plate 17. While passing through the solder the lower end of the can is soldered and takes up a small amount of surplus solder both on the inside and outside. The solder gains access to the inside between the wall of the can and the flange on the bottom or top wall thereof. From the point 19 the can passes down the incline 20, and in this downward movement the can stands in a perpendicular plane. The solder which has been taken up by the immersed edge of the can will flow down the lower edge and laterally across such edge. This result is attained from the fact that there is solder within the can, while the flange on the top or bottom wall of the can forms, as it were, a contracted gutter or channel, which directs the solder in this lateral passage across the edge of the can. After passing down the incline 20 the can will be tipped to the opposite side at the point 21 in Figs. 1ª and 2, whereby the third edge of the can will be soldered and another small amount of surplus solder will be taken up. The can will then be moved up the incline 22 in Figs. 1ª and 2 and the fourth edge will be soldered in a manner similar to that in which the second edge was soldered. The can will then move forward in a horizontal direction upon the plate 17 and any surplus solder will be removed by the wipers 66 and 76, and it will then be exposed to the cold-air blast, which will cool it sufficiently to fix the solder.

I have described the construction and operation of that portion of my machine which solders one end of the can. This portion of the machine constitutes one section, the remainder of the machine being composed of a turning device for reversing the cans, so that the unsoldered end will rest upon the plate 17, so that it may be soldered, and soldering devices similar to those already described.

The device for reversing the cans or turning them end for end consists of an angular plate 78, which is provided with an upwardly and outwardly extending portion 79. The plate 78 is secured to the frame 15 and projects diagonally under the carrying-chain in such position that as the cans are moved along in the frames 40 the portion 79 of the plate 78 will come in contact with one of the sides of the cans near their lower ends, and as the can is moved along it will be tilted sidewise by the diagonal position of the portion 79 of the plate. The turning device is of such size as to throw the lower portion of the can up until the frame 40 is turned more than a quarter of a revolution. The weight of the can will then cause it to complete a half-revolution, and the end which was formerly uppermost will now be below and will rest upon a second plate 17. In order to prevent the can from falling out of the frame 40 as it is overturned, an arm 80 is provided, which is preferably attached to a portion of the plate 78 and extends outward and upward in such position that it will engage the can if it should tend to slide out of the frame and prevent such motion. The can will then be carried along the plate 17 and the second end will be soldered in a manner similar to that in which the first end was soldered.

In order to effect a perfect union of the solder on the first and last soldered edges of the can, the plate 17 is again laterally inclined at the point 70 in Figs. 1ª, 1ᵇ, and 2, the inclination of the plate being in the same direction as at first. This will cause the can to tilt sufficiently to cause the molten solder to flow to and unite with the solder on the edge first soldered, and a perfect joint will thereby be formed.

The machine above described is particularly intended for use in soldering cans polygonal in cross-section, and especially for cans rectangular or oblong in cross-section.

In describing the operation of the machine

I have described the operation of soldering rectangular cans; but the machine may also be used for soldering round cans, for the operation would not vary materially.

It should be understood that the word "square" as used herein is intended to comprehend not only cans square in cross-section, but also all other cans rectangular and quadrilateral in cross-section.

That which I claim as new, and desire to secure by Letters Patent, is—

1. The process of soldering square cans, which consists in immersing two of the edges of the can at different times in molten solder and tilting the can after immersing each of said edges to cause the surplus solder to flow along and solder the unsoldered edge of the can adjacent to that immersed, whereby the four edges of the can will be soldered by the immersion of only two of the edges in the solder, substantially as described.

2. The process herein described of soldering cans, which consists in heating the can, immersing one edge of the can in molten solder, tilting the can in one direction away from a vertical plane to cause the surplus solder to flow along the edge of the can adjacent to that first immersed, tilting the can in another direction away from a vertical axis and while so tilted immersing the edge opposite that first immersed in molten solder, and again tilting the can away from a vertical axis and causing the surplus solder from the last immersed edge to flow along the remaining unsoldered edge, substantially as and for the purpose set forth.

3. In a can-soldering machine, the combination, with solder-applying devices, of mechanism for tilting the can away from and about a vertical axis, so as to successively depress each of the lower edges of the can below the others, substantially as described.

4. In a can-soldering machine, the combination, with solder-applying devices, of a track for supporting the cans to be soldered, devices for tilting the cans away from and about a vertical axis, so as to successively depress each of the lower edges of the can below the others, and means for moving the can along the said track, substantially as described.

5. In a can-soldering machine, the combination, with solder-applying devices, of a track for supporting the can to be soldered, means for heating said track, devices for tilting the can away from and about a vertical axis, so as to successively depress each of the lower edges of the can below the others, and means for moving the can along said track, substantially as described.

6. In a machine for soldering square cans, the combination, with two solder baths and devices for immersing two of the lower edges of the can at different times in the solder baths, of mechanism for tilting the can away from and about a vertical axis to immerse two edges thereof in the solder baths and cause the molten solder to flow along the unsoldered edges of the can, whereby the four edges of the can will be soldered by the immersion of only two of the edges in the solder, substantially as described.

7. In a machine for soldering square cans, the combination, with two solder baths and devices for immersing two opposite lower edges of the can at different times in the solder bath, of mechanism for tilting the can away from and about a vertical axis to cause the solder to flow along the unsoldered edge of the can, whereby the four edges of the can will be soldered by the immersion of only two of the edges in the solder, substantially as described.

8. In a can-soldering machine, the combination, with a solder-pot, of a track for supporting the can, devices for tilting the can away from and about a vertical axis, so as to successively depress each of its edges below the level of the others, apparatus for moving the can upon said track, and means for reversing the can, substantially as described.

9. In a can-soldering machine, the combination, with a solder-pot, of a track for supporting the can, devices for tilting the can away from and about a vertical axis, so as to successively depress each of its edges below the level of the others, apparatus for moving the can upon said track, and means for heating the can as it moves upon said track, substantially as and for the purpose specified.

10. In a can-soldering machine, the combination, with a solder-pot, of a track for supporting the can, devices for tilting the can away from and about a vertical axis, so as to successively depress each of its edges below the level of the others, apparatus for moving the can upon said track, and means for heating said track, substantially as and for the purpose specified.

11. The combination, with a solder-pot, of a track adapted to support and guide a can, means for heating said track, said track being inclined opposite the solder-pot in such manner that one edge of the can will dip into the solder in the pot as it moves along upon said track, a forward inclination in said track beyond the solder-pot, and mechanism for moving the can along said track, substantially as described.

12. The combination, with a solder-pot, of a track adapted to support and guide a can, said track being inclined at a point opposite the solder-pot in such manner that the can will be tilted away from a vertical axis and one of the edges dipped into the solder as the can moves upon the track, devices for tilting the can away from a vertical axis after it has passed the solder-pot to cause the surplus solder to flow along one of its edges adjacent to that which is dipped into the solder, and mechanism for moving the can along said track, substantially as described.

13. In a can-soldering machine, the combination, with solder-pots, of a track having lateral inclinations and forward inclinations arranged in such manner as to successively depress each of the edges of the can below the level of the others as it moves along said track, and mechanism for moving the can along the track, substantially as and for the purpose specified.

14. In a can-soldering machine, the combination of a track having lateral inclinations and forward inclinations alternately arranged, whereby each of the edges of a can is successively depressed below the others as the can moves along upon said track, with solder-pots placed at the laterally-inclined portions of said track and so arranged that the lower edge of the can as it moves over said laterally-inclined portions of the track will dip into the solder, mechanism for moving the can along said track, and means for keeping the solder in the solder-pots in a molten condition, substantially as described.

15. In a can-soldering machine, the combination, with solder-pots and a track upon which the cans are adapted to be moved, said track being so arranged as to cause the cans to tilt away from and about a vertical axis in such manner as to depress each of their edges successively below the others, of a chain for moving said cans along said track, said chain being so arranged as to permit of the tilting of the cans, substantially as described.

16. In a can-soldering machine, the combination, with solder-pots and a track upon which the cans are adapted to be moved, said track being so arranged as to cause the cans to tilt away from and about a vertical axis in such manner as to depress each of their lower edges successively below the others, of a chain for moving the cans along said track and frames carried by said chain, said frames being adapted to receive the cans to be soldered and to permit of the tilting of the cans in a direction at right angles to their line of motion, substantially as described.

17. In a can-soldering machine, the combination, with solder-pots, of a stationary plate extending longitudinally of the machine and formed with inclined portions by which the cans are caused to tilt to depress each of their edges below the others, a chain for moving the cans along said plate, and frames carried by said chain, said frames being adapted to receive the cans to be soldered and said frames being trunnioned or pivotally mounted in said chain in such position that they will be adapted to tilt in a direction at right angles to the line of motion of the chain, substantially as described.

18. In a can-soldering machine, the combination, with solder-pots, of a stationary plate extending longitudinally of the machine and formed with inclined portions by which the cans are caused to depress each of their edges below the others, the chains 34, cross-bars 35, by which said chains are carried, rollers upon the ends of said cross-bars, a frame pivoted or trunnioned in said cross-bars at right angles to the line of motion of the chains, said frame being adapted to receive a can, and a track for the rollers upon the ends of the cross-bars 35, substantially as described.

19. The combination, with a supporting-frame and a plate supported by said frame, said plate being adapted to form a track upon which the cans may be moved and having inclinations for causing the cans to tilt away from and about a vertical axis in such manner as to depress each of their edges successively below the others, of solder-pots supported in said frame in such position that when the cans are carried along upon said plate their alternate lower edges will be immersed in the solder in the solder-pots, devices for heating said plate and for keeping the solder in the solder-pots in a molten condition, and devices for moving said cans upon said plate, substantially as described.

20. The combination, with a supporting-frame and a plate supported by said frame, said plate being adapted to form a track upon which the cans may be moved and said plate being so shaped as to cause the cans to tilt in such manner as to depress each of their edges successively below the others, of solder-pots supported in said frame in such position that when the cans are laterally tilted their lowermost edges will be immersed in the solder in the solder-pots, devices for heating said plate and for keeping the solder in the solder-pots in a molten condition, a chain adapted to receive said cans and to move them along said plate, said chain having cross-bars 35, and rollers 36 upon the ends of said cross-bars, and angle-irons 44, 45, and 46, said angle-irons being adapted to form tracks for the rollers 36, substantially as described.

21. In a can-soldering machine, the combination, with solder-pots, of a stationary plate extending longitudinally of the machine and formed with inclined portions by which the cans are caused to tilt to depress each of their edges below the others, a chain for moving said cans along said plate, and a track for supporting said carrying-chain, said track being laterally deflected, as described, to cause the edges of the cans to be more completely immersed in the solder in the solder-pots, substantially as described.

22. In a can-soldering machine, the combination, with a plate having lateral inclinations and solder-pots on opposite sides of the plate, said inclinations of the plate being such as to cause the lowermost edge of a can as it moves upon said plate to be immersed in the solder in the solder-pot, of a chain for moving the cans along said plate and a track for supporting said chain, said track being laterally deflected at the points opposite the lateral inclinations of the plate in such manner as to cause the cans to move toward the lowermost side of the plate, substantially as and for the purpose specified.

23. In a can-soldering machine, the combination, with a track having lateral inclinations and forward inclinations alternately arranged, whereby each of the edges of the can is depressed successively below the others as the can moves upon said track, of solder-pots placed at the laterally-inclined portions of said track and so arranged that the lower edge of the can as it moves over said laterally-inclined portions of the track will dip into the solder, mechanism for moving the can along said track, and guide-bars 63 and 65, substantially as and for the purpose specified.

24. The combination, with a supporting-frame, of a plate 17, having laterally-inclined portions 19 and 21 and forwardly-inclined portions 20 and 22, solder-pots located at the laterally-inclined portions 19 and 21 in such position that when a can is moved along upon said plate 17 its lowermost edge will dip into the solder in the solder-pot, and devices for moving the cans upon said plate, substantially as described.

25. The combination, with a supporting-frame and a plate 17, having laterally-inclined portions 19 and 21 and forwardly-inclined portions 20 and 22, of solder-pots 23, supported in the frame opposite the laterally-inclined portions 19 and 21, each of said solder-pots having an opening 26, devices for moving the cans upon said plate 17, and devices for heating said plate 17 and the solder-pots, substantially as described.

26. The combination, with the supporting-frame 15, plate 17, supported thereby, the plate having laterally-inclined portions 19 and 21 and forwardly-inclined portions 20 and 22, and solder-pots supported in said frame opposite the laterally-inclined portions 19 and 21, of jets 29, mounted under said plate 17 and the solder-pots, gas-pipe 30, and air-pipe 31, adapted to conduct gas and air, respectively, into said pipe 29, substantially as described.

27. The combination, with mechanism for soldering the seams at one end of a can and mechanism for soldering the seams at the other end of a can, of a chain adapted to carry the cans from one soldering mechanism to the other and a turning device located between said two sets of soldering mechanism, said turning device serving to lift and deflect the cans laterally, whereby they are overturned, substantially as described.

28. The combination, with a plate 17 and a supporting-frame therefor, of sprocket-wheels journaled at one end of said frame, sprocket-wheels 48, journaled at the other end of said frame, plates 54, vertically secured in the end of the frame between the sprocket-wheels 48, and a can-carrying chain having frame 40, the plates 54 being so arranged as to form guides to hold the cans in a vertical position when they are moving around the end of the frame, substantially as described.

29. The combination, with a plate 17, a supporting-frame therefor, said frame having sprocket-wheels 47 journaled at one end and sprocket-wheels 48 journaled at the other end, and a can-carrying chain having a frame 40, said chain being adapted to be operated by said sprocket-wheels, of a bar 56, secured in said frame and having the rounded end 59 so arranged as to loosen the cans in the frame 40, substantially as described.

30. The combination, with a plate 17, a supporting-frame therefor, and sprocket-wheels 47 and 48, located at opposite ends of said frame, of a can-carrying chain adapted to be operated by said sprocket-wheels to move the cans upon the plate 17, said can-carrying chain having frames 40, and a plate 53, adapted to straighten said frames 40, substantially as described.

31. The combination, with a supporting-frame, of a plate 17, having laterally-inclined portions 19 and 21 and forwardly-inclined portions 20 and 22, solder-pots 23, supported by said frame opposite the laterally-inclined portions 19 and 21 in such position that when a can is moved along upon said plate 17 its lowermost edge will dip into the solder in the solder-pot, and downwardly-projecting lips 25 upon said plate 17, said lips being so placed as to project into the solder-pots, substantially as and for the purpose specified.

32. The combination, with a plate having laterally-inclined portions 19 and 21 and forwardly-inclined portions 20 and 22 and solder-pots located under said laterally-inclined portions 19 and 21 and so arranged that when a can is moved along upon said plate its lowermost edge will dip into the solder in the solder-pots, of devices for wiping the surplus solder from the outside of the can, a cold-air pipe adapted to direct a current of cold air upon said cans immediately after they pass the wipers, and mechanism for moving said cans along said plates, substantially as described.

33. The combination, with a rod, a horizontal disk 71, secured to said rod, said disk having a flat upper surface, and slots in said disk, of a rod 68, pivoted upon the upper end of said rod, said rod 68 having a bearing 73, a disk 72, secured to said bearing, said disk being adapted to rest upon the disk 71 and having pins 74 projecting from its under surface, adapted to enter the slots in the disk 71, and wiper 66, secured upon the outer end of the rod 68, substantially as described.

34. The combination, with a track for supporting cans and a frame for supporting said track, of a rod 69, supported by said frame, a rod 68, pivoted at one end upon said rod 69, a wiper secured in the other end of said rod 68 and adapted to bear against a can as it is moved upon said track, and a spring for holding said wiper in contact with the can, substantially as described.

35. The combination, with a track for supporting cans and a frame for supporting said track, of a rod 69, supported by said frame, a rod 68, pivoted at one end upon said rod 69, a wiper secured in the other end of said rod 68 and adapted to bear against a can as it is moved upon said track, a spring for holding said wiper in contact with the can, and devices for limiting the outward motion of said wiper, substantially as described.

CHARLES H. EMERY.

Witnesses:
JOHN L. JACKSON,
NELLIE McKIBBEN.